United States Patent [19]

Hayen

[11] Patent Number: 4,741,423
[45] Date of Patent: May 3, 1988

[54] CLUTCH DISC FOR A FRICTION CLUTCH

[75] Inventor: Johann Hayen, Eversmeer, Fed. Rep. of Germany

[73] Assignee: Fichtel & Sachs AG

[21] Appl. No.: 890,072

[22] Filed: Jul. 24, 1986

[30] Foreign Application Priority Data

Jul. 24, 1985 [DE] Fed. Rep. of Germany ....... 8521345

[51] Int. Cl.$^4$ ................................................ F16D 3/14
[52] U.S. Cl. .................. 192/106.2; 464/64; 464/68
[58] Field of Search ............... 192/106.2, 70.17, 106.1; 464/64, 68

[56] References Cited

U.S. PATENT DOCUMENTS

| | | | |
|---|---|---|---|
| 2,920,733 | 1/1960 | Lysett | 464/64 |
| 3,138,011 | 6/1964 | Stromberg | 464/64 |
| 3,578,121 | 5/1971 | Maurice | 192/106.2 |
| 4,381,052 | 4/1983 | Maucher | 192/106.2 |
| 4,485,907 | 12/1984 | Nishimura | 192/106.2 |
| 4,538,718 | 9/1985 | Maucher | 192/106.2 |

FOREIGN PATENT DOCUMENTS 8128173 9/1981 Fed. Rep. of Germany .

*Primary Examiner*—Rodney H. Bonck
*Assistant Examiner*—David A. Testardi
*Attorney, Agent, or Firm*—Toren, McGeady & Associates

[57] ABSTRACT

The clutch disc comprises two side discs firmly connected with a hub, between which there are arranged two intermediate discs rotatable in relation to the hub. Between the intermediate discs there is arranged a middle disc rotatable in relation to these discs, which is connected non-rotatably through tabs with a friction lining carrier. The tabs couple the friction lining carrier with predetermined play in rotation with the intermediate discs. At least two springs with different spring ratings, arranged coaxially one within the other, are seated in windows of the discs. The weaker inner spring is loaded on a relative rotation of the middle disc and the intermediate disc, while the stronger outer spring is effective on a relative rotation of the intermediate discs for the one part and the side discs for the other part. The inner spring forms an idling vibration damper while the outer spring and possibly further such springs form an under-load vibration damper.

9 Claims, 3 Drawing Sheets 4,741,423

CLUTCH DISC FOR A FRICTION CLUTCH

BACKGROUND OF THE INVENTION

The invention relates to a clutch disc for a friction clutch, especially of a motor vehicle.

From Fed. German Utility Model No. 8,128,173 a clutch disc is known the torsional vibration damper of which comprises helical compression springs of different spring ratings arranged coaxially one within the other. The vibration damper couples a friction lining carrier rotationally elastically with a hub intended for connection to a gear-input shaft. Two side discs are mounted rotatably through a limited angle of rotation on the hub, between which side discs there are seated two intermediate discs which in turn are mounted on the hub rotatably through a limited angle of rotation. The friction lining carrier is connected with the intermediate discs. A hub disc firmly connected with the hub is arranged between the intermediate discs. The inner springs are weaker than the outer springs and form an idling vibration damper while the outer springs form an under-load vibration damper.

The problem underlying the invention is to improve the clutch disc of the type as explained above so that it can also transmit comparatively large torques. Furthermore the design features are to be so selected that the clutch disc can be adapted as regards its damping properties to different requirements without problem, that is without major design modifications.

SUMMARY OF THE INVENTION

The clutch disc according to the invention for a friction clutch, especially of a motor vehicle, comprises a hub on which two side discs are fixed with axial spacing. Two intermediate discs arranged between the side discs are rotatable in relation to the side discs through a limited angle of rotation and enclose between them a middle disc which is likewise rotatable in relation to the side discs which is likewise rotatable in relation to the side discs and the hub. The middle disc has the function of a control disc and is connected non-rotatably with a friction lining carrier of the clutch disc while the intermediate discs are coupled with predetermined play in rotation, but otherwise non-rotatably, with the friction lining carrier. In mutually axially aligned windows of the side discs, the intermediate disc and the middle disc there are seated springs, preferably helical compression springs, arranged coaxially one within the other which couple the friction lining carrier rotationally elastically with the hub. The weaker springs are arranged coaxially in the stronger springs and are stressed in the relative rotation of the middle disc and the side discs. The weaker springs form an idling vibration damper. The stronger springs are stressed in the relative rotation of the side discs and the intermediate discs and form an under-load vibration damper.

The friction lining carrier has substantially the form of an annular disc and carries on its internal circumference preferably axially protruding tabs which engage in apertures of the middle disc and the intermediate discs. The tabs couple the friction lining carrier with the middle disc and the side discs and guide the friction lining carrier at the same time radially on these discs. The ends of the tabs are expediently bent over radially inwards so that they engage between one of the intermediate discs and the adjacent side disc and also axially fix the friction lining carrier.

The torque exerted by the friction lining carrier is introduced symmetrically with the side discs, firmly connected with the hub, into the middle disc which in turn acts directly upon the springs of the idling vibration damper. The torque occurring in operation under load is in turn conducted by way of the tabs of the friction lining carrier directly to the intermediate discs arranged symmetrically in relation to the middle disc. For this purpose the intermediate discs are preferably firmly connected with one another. Both the middle disc and the intermediate discs have approximately the same contours and are easy to adapt to the requirements in each case concerning the number and the configuration of the springs.

The various features of novelty which characterize the invention are pointed out with particularity in the claims annexed to an forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
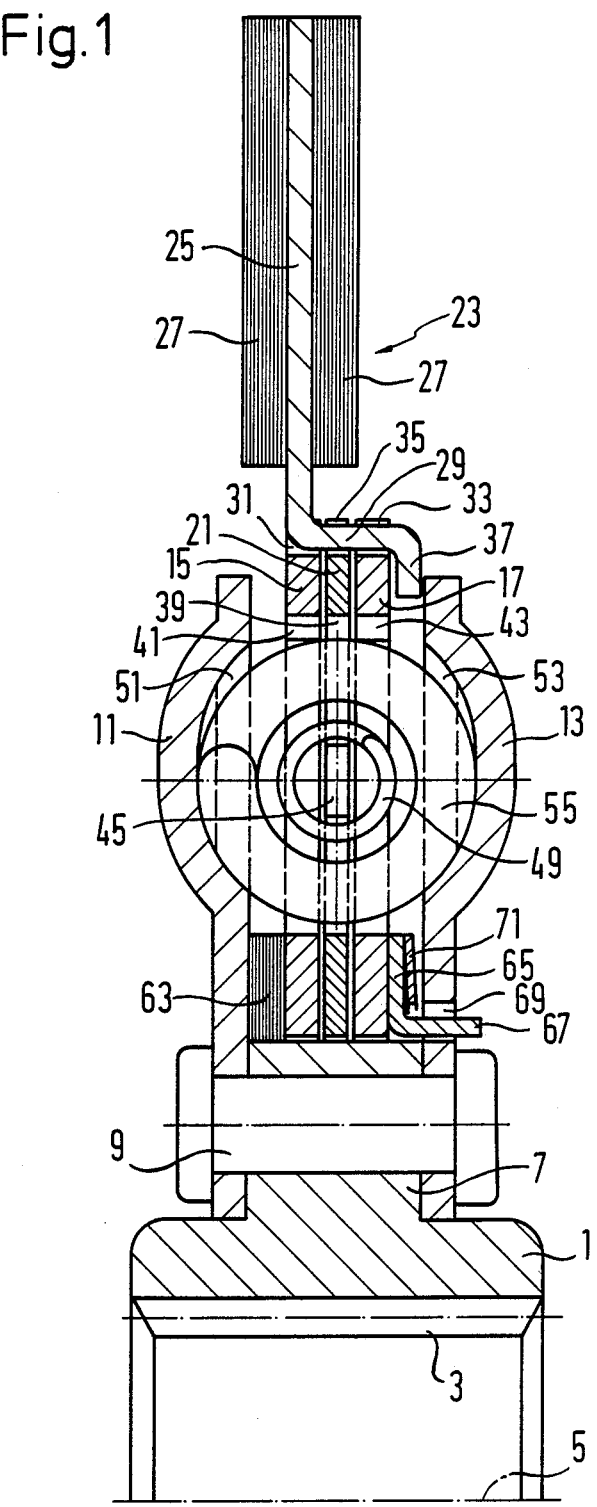
FIG. 1 shows an axial longitudinal section through the upper half of a clutch disc for a motor vehicle friction clutch, seen along a line I—I in FIG. 2.
Figure 2:
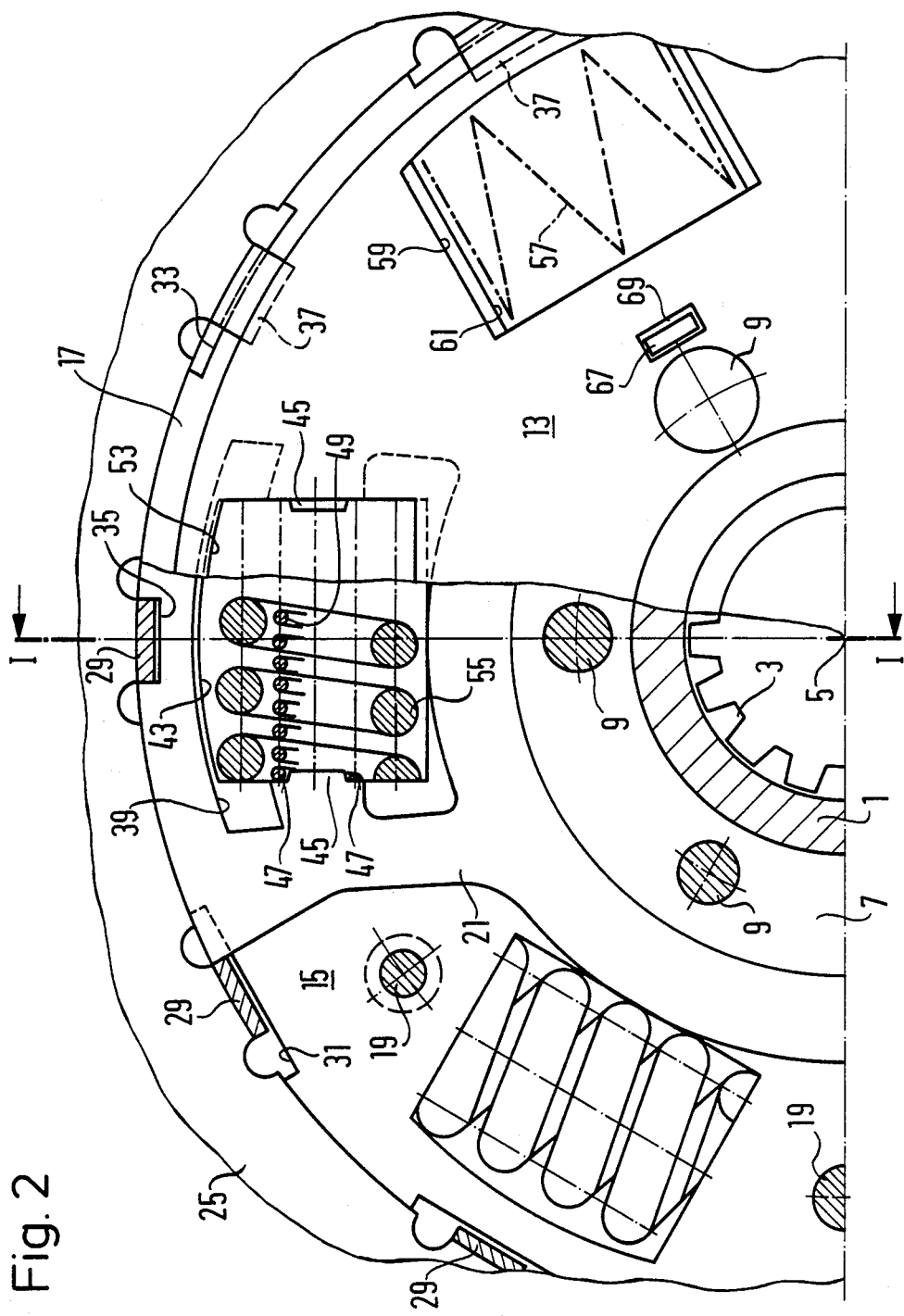
FIG. 2 shows a partially broken away lateral elevation of the clutch disc according to FIG. 1

The clutch disc as represented in FIGS. 1 and 2 for a motor vehicle friction clutch comprises a hub 1 which can be coupled non-rotatably but axially displaceably through an internal toothing 3 with a gearing input shaft (not shown further) which is rotatable about a rotation axis 5. The hub 1 carries a radially protruding securing flange 7 to which two annular side discs 11, 13 are secured by rivets 9, with axial spacing from one another. Axially between the two side discs 11, 13 there are arranged two annular intermediate discs 15, 17 which are firmly connected with one another through distance rivets 19 (FIG. 2). The unit of the two intermediate discs 15, 17 is mounted coaxially with the rotation axis 5 on the hub 1, or more precisely on its securing flange 7. Axially between the two intermediate discs 15, 17 there is arranged a middle disc 21 which is mounted rotatably in relation to the intermediate discs 15, 17 on the securing flange 7.

A friction lining carrier 23 is guided radially on the middle disc 21 and the two side discs 15, 17. The friction lining carrier 23 has an annular carrier disc 25 which is provided with clutch friction linings 27 axially on both sides. The carrier disc 25 is arranged substantially in the plane of the intermediate disc 15 and carries axially bent-off tabs 29 on its inner circumference which engage in apertures 31, 33 of the intermediate discs 15, 17. The apertures 31, 33 are wider than the tabs 29 in the circumferential direction of the intermediate discs 15, 17, so that the friction lining carrier 23 is rotatable through a predetermined play in rotation about the rotation axis 5 in relation to the intermediate discs 15, 17. One part of the tabs 29 furthermore engages in apertures 35 on the external circumference of the middle disc 21 and couples the friction lining carrier 23 substantially without play in rotation non-rotatably with the middle disc 21. The tabs 29 have radially inwardly bent over ends 37 which extend in the radial direction between the intermediate disc 17 and the adjacent side disc 13 and axially fix the friction lining carrier 23, which is rotatable in relation to the side discs 11, 13.

The middle disc 21 has at least one window 39 opposite to which in the axial direction there lie windows 41, 43 of the side discs 15 and 17. The window 39 of the middle disc 21 is longer in the circumferential direction of the disc than the windows 41, 43 and carries, on its sides opposite to one another in the circumferential direction, extensions 45 which abut with stop faces 47 on the ends of a helical compression spring 49 and at the same time radially guide the spring 49. Seen in the axial direction the stop faces 47 of the two extensions 45 are aligned with the circumferentially opposite edges of the windows 41, 43 in the two intermediate discs 15, 17. The spring 49, or possibly several of these springs, couples the middle disc 21 and thus the friction lining carrier 23 rotationally elastically with the intermediate discs 15, 17 and forms a vibration damper dimensioned for idling operation.

Windows 51, 53 are likewise provided in the side discs 11, 13 aligned in the axial direction with the windows 39, 41 and 43. In the windows 51, 53 there engages a helical compression spring 55 the ends of which abut on the circumferentially mutually opposite edges of the windows 41, 43 of the intermediate discs 15, 17 for the one part and of the windows 51, 53 of the side discs 11, 13 for the other part. The spring 55 couples the intermediate discs 15, 17 rotationally elastically with the side discs 11, 13 and thus with the hub 1. The spring 55 coaxially surrounds the spring 49 and has a higher spring rating than the spring 49. The spring 55 is a constituent of a vibration damper of the clutch disc which will be explained in greater detail below and is dimensioned for operation under load. The under-load vibration damper comprises, in addition to the spring 55, further springs such for example as the springs 57 which are seated likewise in windows of the middle disc 21, the intermediate discs 15, 17 and the side discs 11, 13 and are stressed in the relative rotation of the intermediate discs 15, 17 and the side discs 11, 13. The windows in the intermediate discs 15, 17 and the side discs 11, 13 can here be of different lengths in the circumferential direction, as indicated in FIG. 2 by a window edge 59 of the side disc 13 and a window edge 61 of the intermediate disc 17. The springs 55, 57 thus come into action at different relative angles of rotation, which renders possible the assembly of multi-stage under-load vibration dampers.

The idling rotation angle range is fixed by the play in rotation of the tabs 29 in the apertures 33. The length of the extensions 45 is preferably dimensioned so that the circumferentially opposite edges of the window 39 abut on the ends of the spring 55 when this play in rotation is taken up. The extensions 45 can however also be longer. In every case their radial width is dimensioned so that they can enter the spring 55.

On introduction of a comparatively slight torque into the friction lining carrier 23 the middle disc 21 is firstly rotated only in relation to the intermediate discs 15, 17. The intermediate discs 15, 17 are connected substantially rigidly in rotation through the comparatively hard spring 55 with the side discs 11, 13 and thus the hub 1.

The tabs 29 and the apertures 33 limit the working range of the idling vibration damper. After the play in rotation between the tabs 29 and the apertures 33 is taken up, the idling vibration damper is bridged over and the friction lining carrier 23 acts in the further rotating movement through the intermediate discs 15, 17, the spring 55 and subsequently the spring 57 upon the side discs 11, 13 and thus the hub 1. The spring 49 of the idling vibration damper is not additionally compressed in the range of operating rotation angle of the under-load vibration damper.

By reason of the different dimensioning of the windows allocated to its springs 55, 57 the under-load vibration damper has a progressive characteristic curve. However a linear characteristic curve can be achieved by equal dimensioning of the windows. The springs 49, 55 ensure a return of the mutually rotatable discs of the vibration dampers.

As shown best by FIG. 1, the clutch disc comprises a friction device dimensioned for the under-load range and arranged radially between the hub 1 and the springs 55. A friction ring 63 is arranged axially between the side disc 11 and the intermediate disc 15. A thrust ring 65 is seated axially between the side disc 13 and the intermediate disc 17 and engages with axially protruding tabs 67 in openings 69 of the side disc 13 and thus is guided non-rotatably but axially displaceably on the side disc 13. The intermediate discs 15, 17 are axially movably guided on the hub 1 so that an axially acting spring 71 stressed in axially between the side disc 13 and the thrust ring 65 stresses the intermediate disc 15 through the friction ring 63 against the side disc 11. In the relative rotation of the intermediate discs 15, 17 for the one part and of the side discs 11, 13 for the other part a friction torque damping the rotational vibrations is produced.

Figure 3:
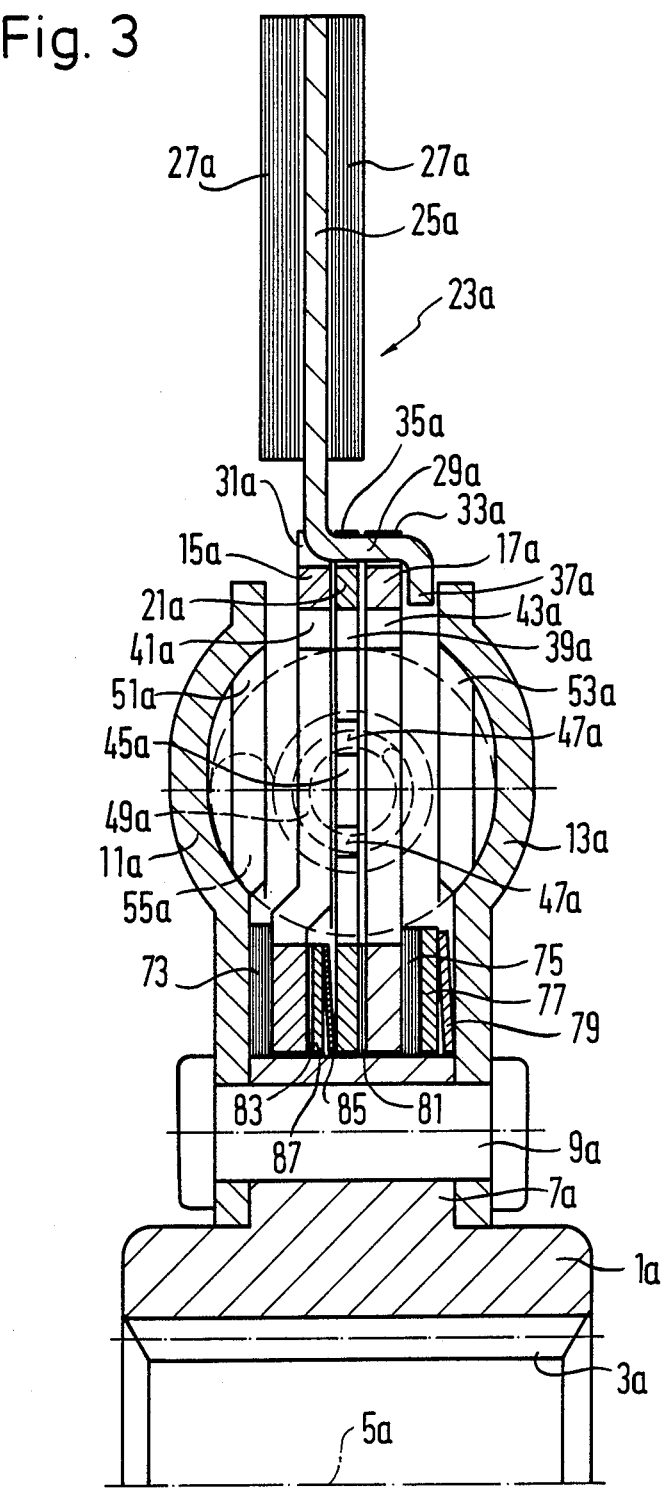
FIG. 3 shows an axial longitudinal section through the upper half of a varient of the clutch disc according to FIG. 1.

FIG. 3 shows a variant of the clutch disc according to FIGS. 1 and 2 which differs essentially only in the configuration of the friction device. Parts of like effect are designated by the reference numerals of FIGS. 1 and 2 and provided with the letter a for distinction. To explain the assembly and manner of operation reference is made to the description of FIGS. 1 and 2. The components visible only from FIG. 2 can also be present in the clutch disc according to FIG. 3.

In distinction from the clutch disc according to FIG. 1 and 2, separate friction devices are provided for idling operation and operation under load. The friction device dimensioned for operation under load comprises a friction ring 73 axially between the side disc 11a and the intermediate disc 15a and a friction ring 75 axially between the intermediate disc 17a and the side disc 13a. Axially between the friction ring 75 and the side disc 13a there is provided a thrust ring 77 guided possibly non-rotatably but axially displaceably on the side disc 13a, and an axially acting spring 79 which clamps in the friction ring 75 between the thrust ring 77 and the intermediate disc 17a is stressed in axially between the thrust ring 77 and the side disc 13a. The friction ring 75 and the intermediate discs 15a, 17a are axially movable so that the spring 79 also clamps in the friction ring 73 between the side disc 11a and the intermediate disc 15a. The under-load friction device is effective in the relative rotation of the intermediate discs 15a, 17a in relation to the side disc 11a and in relation to the thrust ring 77 connected with the side disc 13a.

The friction device dimensioned for idling operation comprises two friction rings 81, 83 which are arranged each between the middle disc 21a and one of the two intermediate discs 15a and 17a. On the side of the middle disc 21a axially remote from the spring 79 there is arranged a further axially acting spring 85 which is supported for the one part on the middle disc 21a and for the other part, through a thrust ring 87 guided possibly non-rotatably but axially displaceably on the middle disc 21a, on the friction ring 83. Since the middle disc 21a is axially movable in relation to the intermediate discs 15a, 17a, the spring 85 clamps the friction ring 81 in between the intermediate disc 17a and the middle disc 21a. This friction device, dimensioned for idling operation is effective in the relative rotation of the middle disc 21a for the one part and the intermediate discs 15a and 17a for the other part.

While specific embodiments of the invention have been shown and described in detail to illustrate the application of the inventive principles, it will be understood that the invention may be embodied otherwise without departing from such principles.

What I claim is:

1. A clutch disc for a friction clutch, comprising
(a) a hub which defines a rotation axis,
(b) two annular side discs which are arranged with axial spacing on the hub and are firmly connected with the hub,
(c) two annular intermediate discs which are arranged axially between the side discs with axial spacing from one another and are held on the hub rotatably about the rotation axis relative to the hub,
(d) an annular middle disc which is arranged axially between the intermediate discs and is held on the hub rotatably about the rotation axis in relation to the intermediate discs and to the hub,
(e) at least one group of mutually axially corresponding windows in the middle disc, the two intermediate discs and the two side discs,
(f) at least one first spring arranged in the windows of the middle disc and the intermediate discs and connecting the middle discs and the intermediate disc rotationally elastically with one another,
(g) at least one second spring enclosing the first spring, arranged in the windows of the intermediate discs and of the side discs and connecting the intermediate discs rotationally elastically with the side discs, which second spring has a higher spring rating than the first spring and penetrates the window of the middle disc with play in the circumferential direction of the middle disc,
(h) an annular friction lining carrier which is connected with the middle disc substantially without play in rotation and with the intermediate discs with a predetermined play in rotation, the friction lining carrier carries axially protruding tabs on its internal circumference, at least one of which engages without play in the circumferential direction in an aperture of the middle disc and at least one of which engages with play in the circumferential direction in an aperture of at least one of the intermediate discs.

2. A clutch disc according to claim 1, wherein the middle disc carries in its window containing the first spring extensions protruding in the circumferential direction towards one another which radially guide the first spring and have stop edges facing one another in the circumferential direction which abut on the first spring.

3. A clutch disc according to claim 1, wherein the middle disc and the two intermediate discs are held axially movably on the hub and wherein a friction ring is arranged between a first of the two intermediate discs and the side disc axially adjacent to the first intermediate disc and an axially acting annular spring is arranged between a second of the two intermediate discs and the side disc axially adjacent to the second intermediate disc.

4. A clutch disc according to claim 3, wherein the intermediate discs are supported axially on one another through distance members, wherein a second friction ring is arranged axially between the axially acting spring and the second intermediate disc, wherein a second axially acting spring is arranged axially between the first intermediate disc and the middle disc and wherein third friction rings are arranged axially between the second axially acting spring and the first intermediate disc for the one part and the middle disc and the second intermediate disc for the other part.

5. A clutch disc for a friction clutch, comprising
(a) a hub which defines a rotation axis,
(b) two annular side discs which are arranged with axial spacing on the hub and are firmly connected with the hub,
(c) two annular intermediate discs which are arranged axially between the side discs with axial spacing from one another and are held on the hub rotatably about the rotation axis relative to the hub,
(d) an annular middle disc which is arranged axially between the intermediate discs and is held on the hub rotatably about the rotation axis in relation to the intermediate discs and to the hub,
(e) at least one group of mutually axially corresponding windows in the middle disc, the two intermediate discs and the two side discs,
(f) at least one first spring arranged in the of windows of the middle disc and the intermediate discs and connecting the middle disc and the intermediate discs rotationally elastically with one another,
(g) at least one second spring enclosing the first spring, arranged in the windows of the intermediate discs and of the side discs and connecting the intermediate discs rotationally elastically with the side discs, which second spring has a higher spring rating than the first spring and penetrates the window of the middle disc with play in the circumferential direction of the middle disc,
(h) an annular friction lining carrier which is connected with the middle disc substantially without play in rotation and with the intermediate discs with a predetermined play in rotation, the friction lining carrier carries on its internal circumference several axially protruding tabs which radially guide the friction lining carrier in the region of the external circumference of the middle disc and of the intermediate disc on at least one of these discs.

6. A clutch disc according to claim 5, wherein the tabs axially overlap at least one of the intermediate discs and the middle disc and have radially inwardly bent over ends which engage axially between said one intermediate disc and the side disc axially adjacent to said one intermediate disc and axially fix the friction lining carrier.

7. A clutch disc according to claim 5, wherein the middle disc carries in its window containing the first spring extensions protuding in the circumferential direction towards one another which radially guide the first spring and have stop edges facing one another in the circumferential direction which abut on the first spring.

8. A clutch disc according to claim 5, wherein the middle disc and the two intermediate discs are held axially movably on the hub and wherein a friction ring is arranged between a first of the two intermediate discs and the side disc axially adjacent to the first intermediate disc and an axially acting annular spring is arranged between a second of the two intermediate discs and the side disc axially adjacent to the second intermediate disc.

9. A clutch disc according to claim 8, wherein the intermediate discs are supported axially on one another through distance members, wherein a second friction ring is arranged axially between the axially acting spring and the second intermediate disc, wherein a second axially acting spring is arranged axially between the first intermediate disc and the middle disc and wherein third friction rings are arranged axially between the second axially acting spring and the first intermediate disc for the one part and the middle disc and the second intermediate disc for the other part.

* * * * *